(12) United States Patent
Fujiwara et al.

(10) Patent No.: US 12,098,271 B2
(45) Date of Patent: Sep. 24, 2024

(54) RESIN COMPOSITION, ADHESIVE MEMBER, AND DISPLAY DEVICE INCLUDING THE SAME

(71) Applicant: Samsung Display Co., Ltd., Yongin-Si (KR)

(72) Inventors: Tetsuya Fujiwara, Yokohama (JP); Hideo Umeda, Yokohama (JP); Katsuhiro Yamamoto, Yokohama (JP); Keisuke Morita, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 558 days.

(21) Appl. No.: 17/117,846

(22) Filed: Dec. 10, 2020

(65) Prior Publication Data
US 2021/0292536 A1    Sep. 23, 2021

(30) Foreign Application Priority Data

Mar. 20, 2020   (KR) .................. 10-2020-0034594

(51) Int. Cl.
| C08L 33/08 | (2006.01) |
| C08F 220/18 | (2006.01) |
| C08F 220/20 | (2006.01) |
| C08G 83/00 | (2006.01) |
| C09J 7/30 | (2018.01) |

(52) U.S. Cl.
CPC ......... *C08L 33/08* (2013.01); *C08F 220/1811* (2020.02); *C08F 220/20* (2013.01); *C08G 83/007* (2013.01); *C09J 7/30* (2018.01); C08L 2205/02 (2013.01); C08L 2205/03 (2013.01); C09J 2203/318 (2013.01); C09J 2203/326 (2013.01); C09J 2301/416 (2020.08); C09J 2433/00 (2013.01)

(58) Field of Classification Search
None
See application file for complete search history.

(56) References Cited

U.S. PATENT DOCUMENTS

| 2014/0342531 A1 | 11/2014 | Tominaga et al. |
| 2016/0304737 A1* | 10/2016 | Kang .................. C09D 133/04 |
| 2017/0025485 A1* | 1/2017 | Kim ....................... C09J 133/06 |

(Continued)

FOREIGN PATENT DOCUMENTS

| JP | 5788841 B2 | 10/2015 |
| JP | 2017036394 A * | 2/2017 ............. C09J 11/06 |
| JP | 2017210607 A * | 11/2017 |

(Continued)

OTHER PUBLICATIONS

WO-2015108063-A1, Jul. 2015, Machine translation (Year: 2015).*

(Continued)

*Primary Examiner* — Satya B Sastri
(74) *Attorney, Agent, or Firm* — CANTOR COLBURN LLP

(57) ABSTRACT

A resin composition includes a first (meth)acrylic resin having a weight average molecular weight of about 500 or less, a second (meth)acrylic resin having a weight average molecular weight of about 6,000 or more, a radical polymerization initiator, and a polyrotaxane compound, where the resin composition has a viscosity in a range of about 1.0 mPa·s to about 100 mPa·s at 25° C.

19 Claims, 8 Drawing Sheets

(56) References Cited

U.S. PATENT DOCUMENTS

2018/0203293 A1　　7/2018　Lee et al.

FOREIGN PATENT DOCUMENTS

| | | | | |
|---|---|---|---|---|
| JP | 2018523841 | A | 8/2018 | |
| JP | 201961323 | A | 4/2019 | |
| JP | 6523098 | B2 | 5/2019 | |
| JP | 201989975 | A | 6/2019 | |
| JP | 201999714 | A | 6/2019 | |
| JP | 2019099714 | A * | 6/2019 | ............... B32B 7/12 |
| KR | 20080008062 | A * | 1/2008 | |
| KR | 101534335 | B1 | 7/2015 | |
| KR | 102002536 | B1 | 7/2019 | |
| KR | 102012779 | B1 | 8/2019 | |
| WO | WO-2015108063 | A1 * | 7/2015 | ........... C08G 83/007 |
| WO | 2017203783 | A1 | 11/2017 | |

OTHER PUBLICATIONS

JP-2017210607-A, Nov. 2017, Machine translation (Year: 2017).*
KR 20080008062 A, Jan. 2008, Machine translation (Year: 2008).*
JP-2019099714-A, Jun. 2019, Machine translation (Year: 2019).*
JP-2017036394-A, Feb. 2017, Machine translation (Year: 2017).*

* cited by examiner ically claims priority to Korean Patent Application No. 10-2020-0034594, filed on Mar. 20, 2020, and all

RESIN COMPOSITION, ADHESIVE MEMBER, AND DISPLAY DEVICE INCLUDING THE SAME

This application claims priority to Korean Patent Application No. 10-2020-0034594, filed on Mar. 20, 2020, and all the benefits accruing therefrom under 35 U.S.C. § 119, the content of which in its entirety is herein incorporated by reference.

BACKGROUND

1. Field

The disclosure herein relates to a resin composition, an adhesive member including the resin composition, and a display device including the adhesive member.

2. Description of the Related Art

Various display devices used for multimedia devices such as a television set, a mobile phone, a tablet computer, a navigation unit, a game console are being developed. Recently, display devices which are foldable, bendable or rollable by being provided with bendable flexible display members are being developed to facilitate portability and improve user convenience.

SUMMARY

In a flexible display device, respective members, elements or layers thereof are desired to secure reliability in folding or bending operations. In addition, an adhesive resin used to form an adhesive layer applied to various types of display device may be desired to have high coating properties for respective members, elements or layers thereof.

The disclosure provides a resin composition capable of providing high applicability and maintaining high durability even at a high temperature, and an adhesive member including the resin composition or prepared therefrom.

The disclosure also provides a display device having high or improved reliability in various operation states such as folding and at a high temperature by including an adhesive member capable of maintaining high adhesive properties regardless of external conditions.

An embodiment of the invention provides a resin composition including a first (meth)acrylic resin having a weight average molecular weight of about 500 or less, a second (meth)acrylic resin having a weight average molecular weight of about 6,000 or more, a radical polymerization initiator, and a polyrotaxane compound, where the resin composition has a viscosity in a range of about 1.0 millipascal-second (mPa·s) to about 100 mPa·s at 25° C.

In an embodiment, the resin composition may satisfy the following formula: 0.9<A/B<4, where A denotes a storage modulus at 25° C. after ultraviolet-curing of the resin composition, and B denotes a storage modulus at 60° C. after ultraviolet-curing of the resin composition.

In an embodiment, the resin composition may further include an organic solvent in an amount of about 0 weight percent (wt %) to about 1 wt %.

In an embodiment, the polyrotaxane compound may have a radical curable group on a side chain thereof.

In an embodiment, the radical curable group may be an acrylate group or a methacrylate group.

In an embodiment, the radical polymerization initiator may include a self-cleavage type radical polymerization initiator and a hydrogen drawing type radical polymerization initiator.

In an embodiment, the content of the second (meth)acrylic resin may be in a range of about 5 wt % to about 20 wt % with respect to the total content of 100 wt % of the first (meth)acrylic resin and the second (meth)acrylic resin.

In an embodiment, a content of the radical polymerization initiator may be in a range of about 0.5 wt % to about 5 wt %.

In an embodiment, a content of the polyrotaxane compound may be in a range of about 1 wt % to about 10 wt %.

In an embodiment of the invention, an adhesive member includes a resin composition, where the resin composition includes a first (meth)acrylic resin having a weight average molecular weight of about 500 or less, a second (meth)acrylic resin having a weight average molecular weight of about 6,000 or more, a radical polymerization initiator, and a polyrotaxane compound. In such an embodiment, the resin composition has a viscosity in a range of about 1.0 mPa·s to about 100 mPa·s at 25° C. is provided.

In an embodiment, the adhesive member may satisfy the following formula: 0.9<A'/B'<4, where A' denotes a storage modulus of the adhesive member at 25° C., and B' denotes a storage modulus of the adhesive member at 60° C.

The resin composition may be an inkjet printing composition.

In an embodiment of the invention, a display device includes a display panel, a window disposed on the display panel, and an adhesive member disposed between the display panel and the window, where the adhesive member includes a resin composition including a first (meth)acrylic resin having a weight average molecular weight of about 500 or less, a second (meth)acrylic resin having a weight average molecular weight of about 6,000 or more, a radical polymerization initiator, and a polyrotaxane compound. In such an embodiment, the resin composition has a viscosity in a range of about 1.0 mPa·s to about 100 mPa·s at 25° C.

In an embodiment, a thickness of the adhesive member may be in a range about 20 micrometers (μm) to about 200 μm.

In an embodiment, the adhesive member may be defined by a layer formed by directly providing the resin composition on one surface of the display panel and ultraviolet-curing the provided resin composition.

In an embodiment, a folding area may be defined in the display device, and the folding area may have a radius of curvature of about 5 millimeters (mm) or less.

In an embodiment, the adhesive member may satisfy the following formula: 0.9<A'/B'<4, where A' denotes a storage modulus of the adhesive member at 25° C., and B' denotes a storage modulus of the adhesive member at 60° C.

In an embodiment, the resin composition may further include an organic solvent in an amount of about 0 wt % to about 1 wt %.

In an embodiment, the display device may further include a light control layer disposed between the adhesive member and the window, and an optical adhesive layer disposed between the light control layer and the window, where the optical adhesive layer may include a polymer derived from the resin composition.

In an embodiment, the light control layer may be a polarizing plate or a color filter layer.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
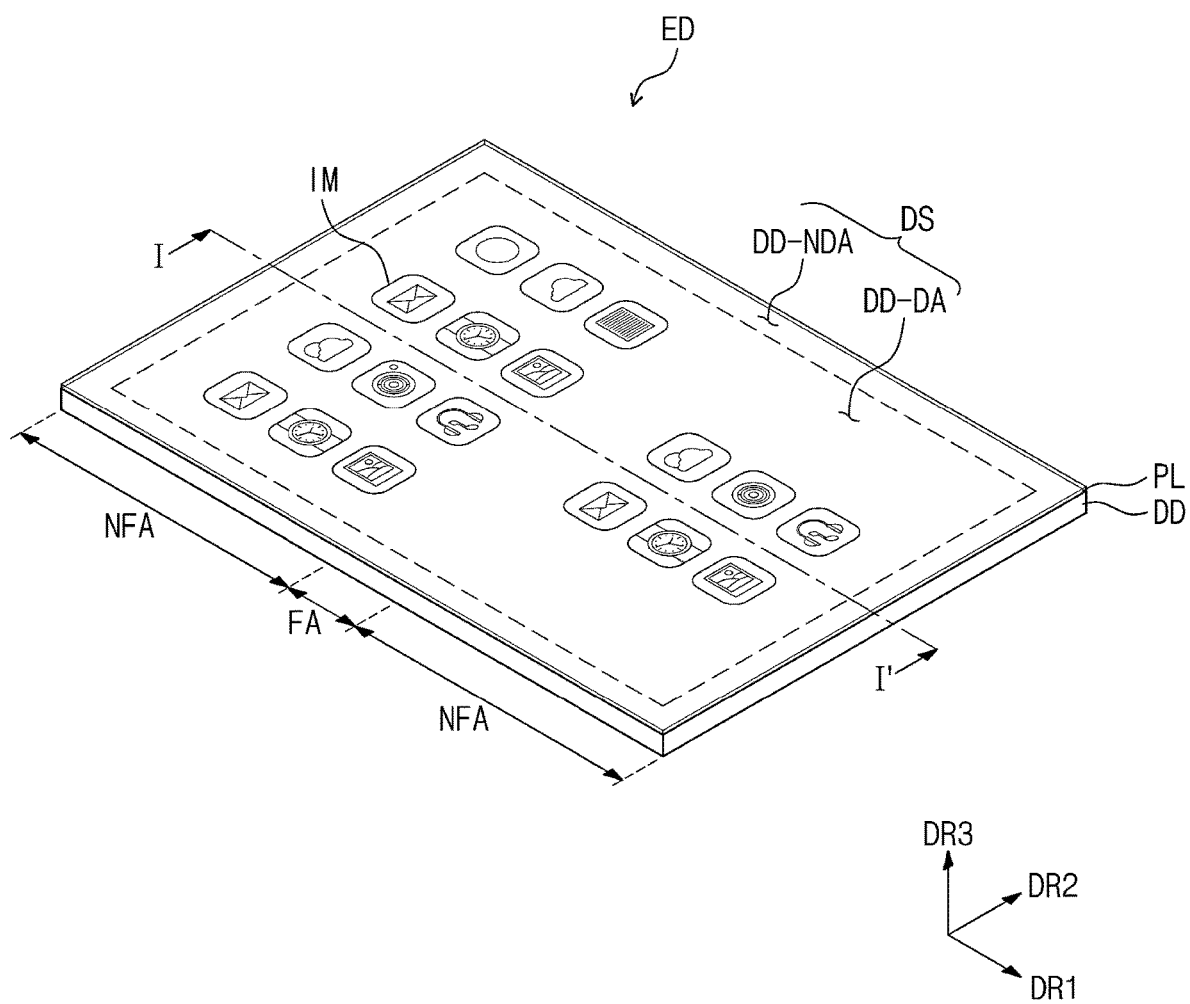
FIG. 1 is a perspective view of a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Meanwhile, in the specification, "directly disposed" means that there is no layer, film, region, plate or the like added between a portion of a layer, a film, a region, a plate or the like and other portions. For example, "directly disposed" may mean disposing without additional members such as an adhesive member between two layers or two members.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the invention. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings. In the disclosure, the term "on" may include the case of being disposed on a lower part as well as an upper part.

Unless otherwise defined, all terms (including technical and scientific terms) used herein have the same meaning as commonly understood by one of ordinary skill in the art to which the invention pertains. It is also to be understood that terms defined in commonly used dictionaries should be interpreted as having meanings consistent with the meanings in the context of the related art, and are expressly defined herein unless they are interpreted in an ideal or overly formal sense.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
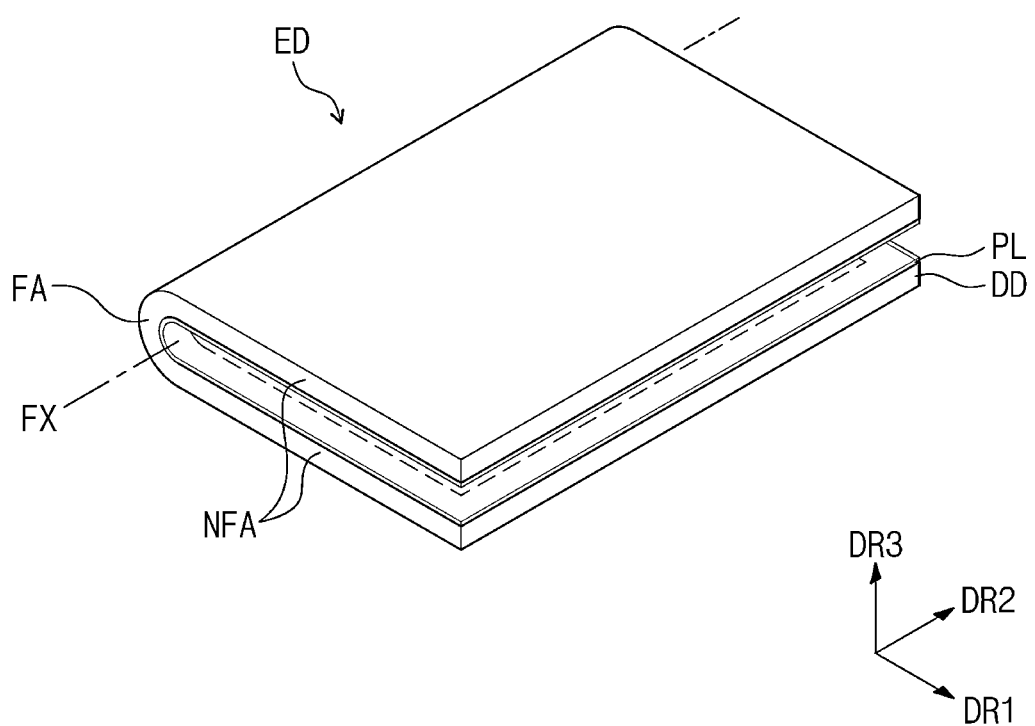
FIG. 2 is a view illustrating the display device shown in FIG. 1 in a folded state.

FIG. 1 is a perspective view of a display device according to an embodiment. FIG. 2 is a view illustrating the display device shown in FIG. 1 in a folded state.

Referring to FIG. 1, an embodiment of a display device DD may have a rectangular shape which has long sides extending in a first directional axis DR1 direction and short sides extending in a second directional axis DR2 direction which crosses the first directional axis DR1. However, an embodiment of the invention is not limited thereto. The display device DD may be modified to have one of other various shapes such as circular and polygonal shapes. The display device DD may be a rigid display device or a flexible display device.

In an embodiment of the display device DD according to the invention, a display surface DS on which an image IM is displayed may be parallel to a plane defined by the first directional axis DR1 and the second directional axis DR2. The normal direction of the display surface DS, that is, the thickness direction of the display device DD is indicated by a third directional axis DR3. A front surface (or an upper surface) and a rear surface (or a lower surface) of each member may be defined by the third directional axis DR3. However, the directions indicated by the first to third directional axes DR1, DR2, and DR3 are relative concepts, and may thus be changed to other directions. Hereinafter, first to third directions correspond to directions indicated by the first to third directional axes DR1, DR2, DR3, respectively, and are given the same reference numerals.

In an embodiment, the display device DD may include at least one folding area FA. Referring to FIGS. 1 and 2, the display device DD may include the folding area FA and a plurality of non-folding areas NFA. The folding area FA is disposed between the non-folding areas NFA, and the folding area FA and the non-folding areas NFA may be arranged adjacent to each other in the first directional axis DR1 direction.

The folding area FA may be a portion deformable into a shape which is folded with respect to a folding axis FX extending in the second directional axis DR2 direction, which is one direction. The folding area FA may have a radius of curvature RD of 5 mm or less.

FIGS. 1 and 2 illustrate an embodiment where a single folding area FA and two non-folding areas NFA are defined, but the numbers of the folding area FA and the non-folding areas NFA are not limited thereto. In one alternative embodiment, for example, the display device DD may include a plurality of non-folding areas NFA which are more than two, and a plurality of folding areas FA disposed between the non-folding areas NFA.

In an embodiment of the display device DD, the non-folding areas NFA may be disposed to be symmetrical to each other with respect to the folding area FA. However, the embodiment of the invention is not limited thereto. In an alternative embodiment, where the folding area FA is disposed between the non-folding areas NFA, the areas of two non-folding areas NFA facing each other with respect to the folding area FA may be different from each other.

The display surface DS of the display device DD may include a display area DD-DA (or DA in FIGS. 3 and 5) and a non-display area DD-NDA (or NDA in FIGS. 3 and 5) around the display area DD-DA. The display area DD-DA may display an image, and the non-display area DD-NDA may not display an image. The non-display area DD-NDA may surround the display area DD-DA, and define an edge (or bezel) portion of the display device DD.

Referring to FIG. 2, an embodiment of the display device DD may be a foldable display device DD which is folded or unfolded. In one embodiment, for example, the folding area FA may be folded along the folding axis FX which is parallel to the second directional axis DR2, so that the display device DD may be folded. The folding axis FX may be defined as a minor axis parallel to the short sides of the display device DD.

When the display device DD is folded, the non-folding areas NFA face each other, and the display device DD may be in-folded such that the display surface DS is not exposed to the outside. However, the embodiment of the invention is not limited thereto. Unlike the case illustrated in the drawing, the display device DD may be out-folded such that the display surface DS is exposed to the outside.

Figure 3:
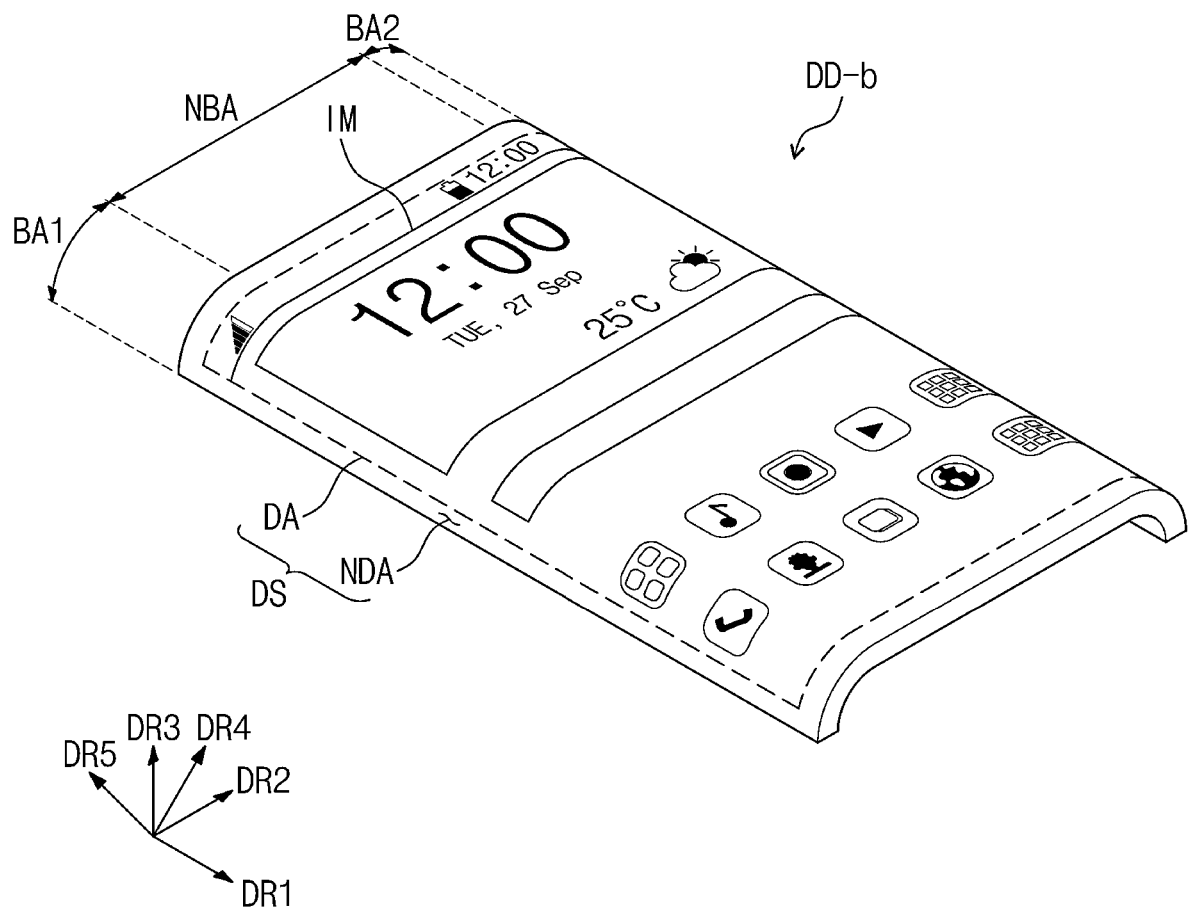
FIG. 3 is a perspective view of a display device according to an embodiment.

FIG. 3 is a perspective view of a display device according to an embodiment. An embodiment of a display device DD-b includes bending areas BA1 and BA2 and a non-bending area NBA, and the bending areas BA1 and BA2 may be bent from one side of the non-bending area NBA.

Referring to FIG. 3, an embodiment of the display device DD-b may include a non-bending area NBA in which an image IM is displayed on a front surface, a first bending area BA1 and a second bending area BA2 in which the image IM is displayed on a side surface. The first bending area BA1 and the second bending area BA2 may be bent from opposing sides of the non-bending area NBA, respectively.

Referring to FIG. 3, the non-bending area NBA may provide the image IM in the third directional axis DR3 direction which is a front surface of the display device DD-b, and the first bending area BA1 may provide an image in a fifth directional axis DR5 direction, and the second bending area BA2 may provide an image in a fourth directional axis DR4 direction. The fourth directional axis DR4 and the fifth directional axis DR5 may be directions crossing the first to third directional axes DR1, DR2, and DR3. However, the directions indicated by the first to fifth directional axes DR1 to DR5 are relative concepts and are not limited to the direction relationships illustrated in the drawings.

In an embodiment, the display device DD-b may be a bending display device including a non-bending area NBA and bending areas BA1 and BA2 disposed on opposing sides of the non-bending area NBA, respectively. In an alternative embodiment, although not shown, the display device may be a bending display device including a single non-bending area and a single bending area. In such an embodiment, the bending area may be provided by being bended only at one side of the non-bending area.

FIGS. 1 to 3 illustrate embodiments of a foldable display device, a bending display device, etc., as described above, but the embodiment of the invention is not limited thereto. Alternatively, the display device may be a rollable display device, a flat rigid display device, or a curved rigid display device.

Hereinafter, embodiments of the display device where the display device DD is foldable with respect to a short axis, but the embodiment of the invention is not limited thereto, and the following descriptions may be applied to various types of display devices as well as the display device DD-b including a bending area.

Figure 4:
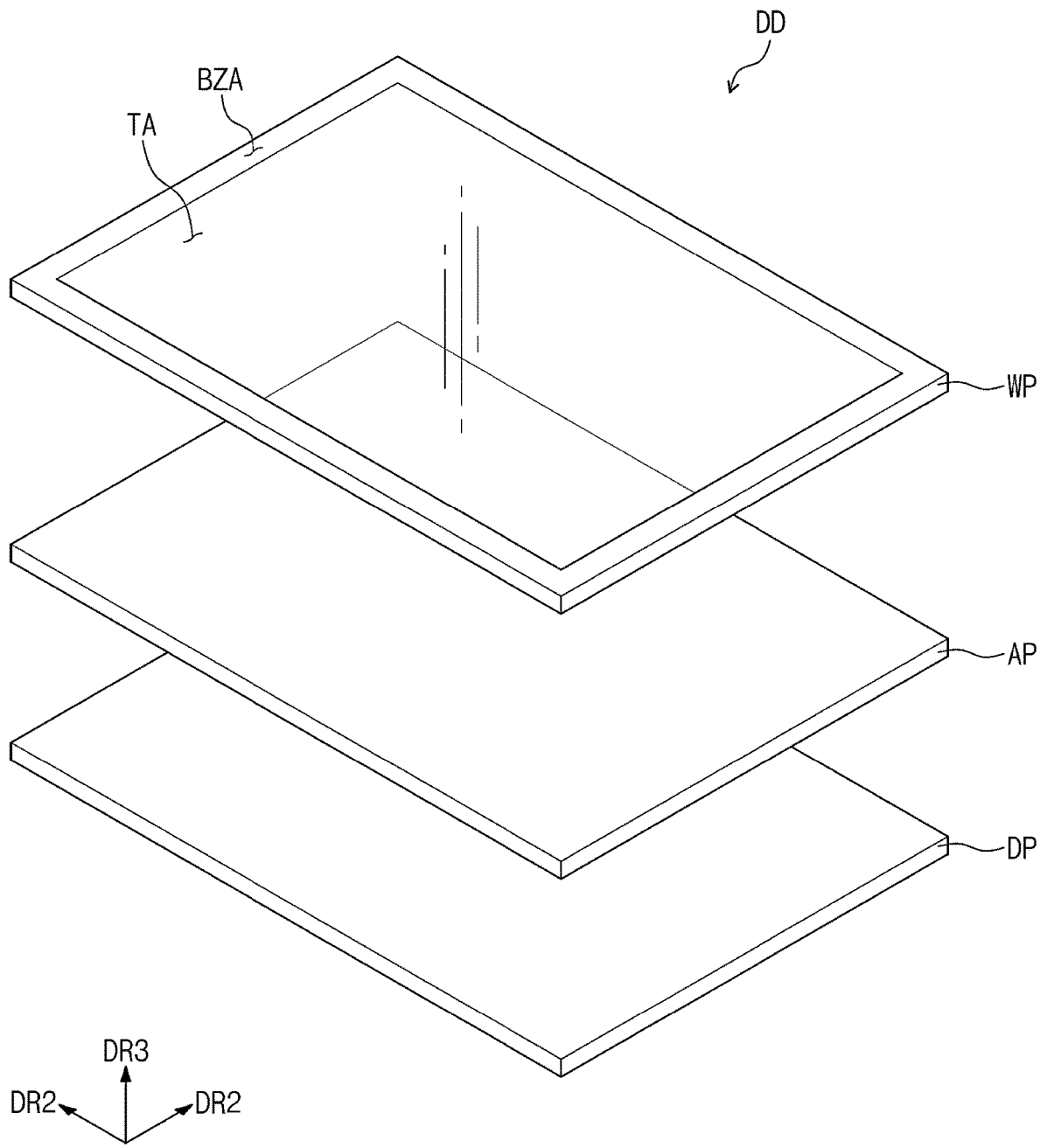
FIG. 4 is an exploded perspective view of a display device according to an embodiment.
Figure 5:
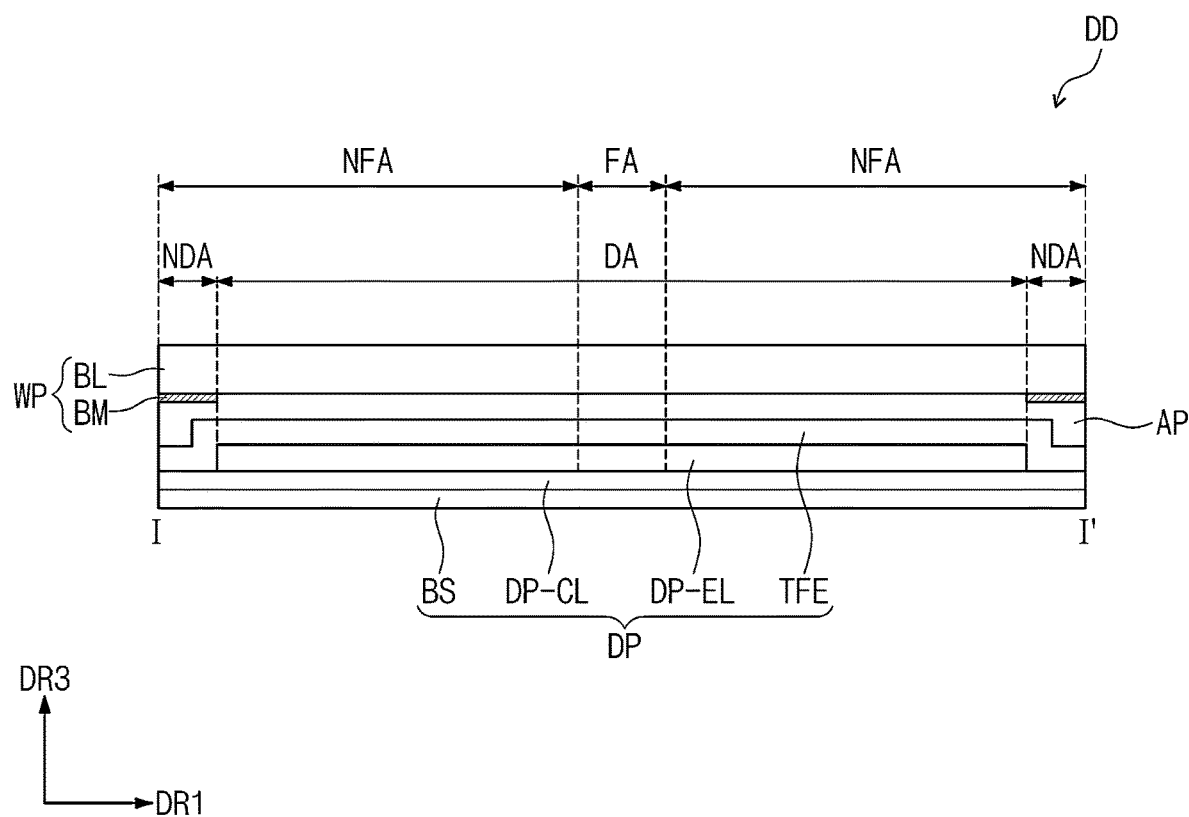
FIG. 5 is a cross-sectional view of a display device according to an embodiment.

FIG. 4 is an exploded perspective view of a display device DD of an embodiment. FIG. 5 is a cross-sectional view of a display device DD of an embodiment. FIG. 5 may be a cross-sectional view of a portion corresponding to a line I-I' of FIG. 1.

The display device DD may include a display panel DP and a window WP disposed on the display panel DP. The display device DD may include an adhesive member (or layer) AP disposed between the display panel DP and the window WP. The adhesive member AP may be an optically clear adhesive film ("OCA") or an optically clear adhesive resin layer ("OCR").

The adhesive member AP may include or be formed from an embodiment of a resin composition according to the invention. The resin composition includes a first (meth) acrylic resin having a weight average molecular weight of 500 or less, a second (meth)acrylic resin having a weight average molecular weight of 6,000 or more, a radical polymerization initiator, and a polyrotaxane compound. Herein, (meth)acrylic refers to acrylic or methacryl.

The resin composition has a viscosity in a range of about 1.0 millipascal-second (mPa·s) to about 100 mPa·s at 25° C., measured by the JIS K2283 method before polymerization reaction with a photoinitiator. Alternatively, the viscosity may be about 50 mPa·s or less. When the viscosity of the resin composition is less than 1.0 mPa·s, the viscosity is low, resulting in a flow of the resin composition liquid provided for forming an adhesive member, and accordingly, it may be difficult to form a coating film having a uniform thickness using the resin composition. In addition, when the viscosity of the resin composition exceeds the above range, i.e., greater than 100 mPa·s, it may be difficult for the resin composition to be discharged in an appropriate amount from an applicator used to apply the resin composition.

The resin composition may satisfy Formula 1 below.

$$0.9 < A/B < 4 \quad \text{[Formula 1]}$$

In Formula 1, A denotes a storage modulus at 25° C. after ultraviolet-curing of the resin composition, and B denotes a storage modulus at 60° C. after ultraviolet-curing of the resin composition.

An embodiment of the resin composition may have a storage modulus in a range of about 0.005 mPa to about 0.100 mPa, or in a range of about 0.010 mPa to about 0.070 mPa, at 60° C. after ultraviolet-curing. An embodiment, the resin composition does not cause a decrease in storage modulus at a high temperature, and may thus maintain high reliability even in a high temperature environment.

An embodiment of the resin composition may further include an organic solvent in an amount of about 0 weight percent (wt %) to about 1 wt %. In such an embodiment, the resin composition does not include an organic solvent at all, or even when an organic solvent is included, it may be in a trace amount of 1 wt % or less, and accordingly, it may be particularly effectively used for an inkjet printing method that may not use a separate drying process after applying the resin composition. When an organic solvent is included, the organic solvent may be aromatic hydrocarbons such as toluene and xylene, esters such as ethyl acetate and butyl acetate, aliphatic alcohols such as n-propyl alcohol and iso-propyl alcohol, ketones such as methyl ethyl ketone, methyl isobutyl ketone, and cyclohexanone, etc.

In an embodiment of the resin composition, the first (meth)acrylic resin may have a weight average molecular weight of 500 or less, or a weight average molecular weight of 400 or less. In an embodiment, the first (meth)acrylic resin may have a weight average molecular weight of 100 or more.

In an embodiment of the resin composition, the first (meth)acrylic resin may include at least one acryloyl group or at least one methacryloyl group per monomer unit. In an embodiment of the resin composition, the first (meth)acrylic resin may include a plurality of different monomers.

In an embodiment of the resin composition, the first (meth)acrylic resin may include at least one selected from alicyclic (meth)acrylate, hydroxy group-containing (meth)acrylate, alkyl (meth)acrylate, and aromatic (meth)acrylate.

In an embodiment of the resin composition, the first (meth)acrylic resin may include at least one selected from 2-ethylhexylacrylate, (2-methyl-2-ethyl-1,3-dioxolan-4-yl)methylacrylate, 4-hydroxybutyl acrylate, 4-acryloylmorpholine, isobornyl acrylate, n-butyl acrylate, butyl-methacrylate, methyl (meth)acrylate, 2-hydroxyethyl acrylate, and octyl (meth)acrylate.

In one embodiment of the resin composition, for example, the first (meth)acrylic resin may include 2-ethylhexylacrylate, (2-methyl-2-ethyl-1,3-dioxolan-4-yl)methylacrylate, 4-hydroxybutyl acrylate, and 4-acryloylmorpholine. However, the embodiment of the invention is not limited thereto, and alternatively, a (meth)acrylic monomer containing at least one acryloyl group or methacryloyl group may be used. In one embodiment, for example, alkyl(meth)acrylate may be n-butyl(meth)acrylate, i-butyl(meth)acrylate, t-butyl (meth)acrylate, isooctyl(meth)acrylate, isodecyl(meth)acrylate, lauryl(meth)acrylate, stearyl(meth)acrylate, isostearyl (meth)acrylate, etc. In one embodiment, for example, alicyclic (meth)acrylate may include dicyclopentenyloxyethyl(meth)acrylate, norbornene(meth)acrylate, dicyclopentanyl(meth)acrylate, isobornyl(meth)acrylate, etc. In one embodiment, for example, cyclic ether(meth)acrylate may include tetrahydrofurfuryl(meth)acrylate, (5-ethyl-1,3-dioxan-5-yl)methyl(meth)acrylate, etc. In one embodiment, for example, hydroxyalkyl acrylate may include 2-hydroxyethyl(meth)acrylate, 2-hydroxypropyl(meth)acrylate, 2-hydroxybutyl(meth)acrylate, etc. In one embodiment, for example, (meth)acrylate having a nitrogen-containing heterocycle may include N-(meth)acryloylmorpholine, N-vinyl-2-pyrrolidone, N-(meth)acryloylpyrrolidone, N-(meth) acryloylpiperidine, N-(meth) acryloylpyrrolidine, N-(meth) acryloylaziridine, aziridinylethyl(meth)acrylate, 2-vinylpyridine, 4-vinylpyridine, 2-vinyl pyrazine, 1-vinyl imidazole, N-vinyl carbazole, N-vinyl phthalimide, etc.

In an embodiment of the resin composition, the second (meth)acrylic resin may have a weight average molecular weight of 6,000 or more, or a weight average molecular weight of 10,000 or more. In an embodiment, the second (meth)acrylic resin may have a weight average molecular weight of 50,000 or less.

In an embodiment of the resin composition, the second (meth)acrylic resin may include at least one acryloyl group or at least one methacryloyl group per monomer unit. In an embodiment of the resin composition, the second (meth) acrylic resin may include a plurality of different monomers.

In an embodiment, the second (meth)acrylic resin may include at least one selected from a (meth)acrylate oligomer having a polyurethane skeleton, a (meth)acrylate oligomer having a polyisoprene skeleton, and a (meth)acrylate oligomer having a polybutadiene skeleton. The second (meth) acrylic resin may include one or two or more (meth)acrylate oligomers.

In an embodiment, the second (meth)acrylic resin may include a photocurable compound containing at least one (meth)acryloyl group having a urethane bond. The urethane acrylate oligomer may include at least one selected from acrylate having a urethane bond, urethane acrylate having a polycarbonate skeleton, and urethane acrylate having a polyether skeleton. In one embodiment, for example, the resin composition may include at least one selected from UN-5500 (Negami Chemical Industrial), UF-C051 (KYOEISHA CHEMICAL), KRM8792 (DAICEL-ALLNEX), and UN-6305 (Negami Chemical Industrial) as a urethane acrylate oligomer.

The resin composition including a second (meth)acrylic resin having a weight average molecular weight of 6,000 or more may exhibit low viscosity properties that may be effectively applied by methods such as inkjet printing or dispensing.

In an embodiment, the resin composition may include the second (meth)acrylic resin in an amount of about 5 wt % to about 20 wt % with respect to 100 wt % of the total content of the first (meth)acrylic resin and the second (meth)acrylic resin. The resin composition includes the second (meth) acrylic resin in an amount of about 10 wt % to about 20 wt %, and thus exhibits a low viscosity of about 1.0 mPa·s to about 100 mPa·s in a resin state, and has high coating properties in an inkjet printing method.

In an embodiment of the resin composition, the polyrotaxane compound is a compound formed by placing blocking groups at both ends of a pseudo-polyrotaxane (both ends of a linear molecule), which is obtained when the cavities of a plurality of cyclic molecules are pierced by a linear molecule in a skewered manner and the plurality of cyclic molecules include the linear molecule, so as not to release the cyclic molecules.

In an embodiment of the resin composition, the polyrotaxane compound may have a radical curable group on a side chain thereof. When the polyrotaxane compound has a radical curable group, polymerization with the first (meth) acrylic resin and the second (meth)acrylic resin may be applicable. The type of the radical curable group may be an unsaturated double bond, and for example, the radical curable group may include a (meth)acrylate group, a (meth) acryloyl group, a vinyl ether group, a styryl group, etc., but is not limited thereto.

In an embodiment of the resin composition, the polyrotaxane compound may have an acrylate group or a methacrylate group on a side chain thereof.

In an embodiment of the resin composition, the polyrotaxane compound may be included in an amount of about 1 wt % to about 10 wt %. The resin composition may include a polyrotaxane compound in the above range to effectively prevent a storage modulus from deteriorating at a high temperature after curing, and to ensure durability at the high temperature.

The resin composition may include at least one radical polymerization initiator. In one embodiment, for example, the resin composition may include a self-cleavage type radical polymerization initiator and a hydrogen drawing type radical polymerization initiator.

The self-cleavage type initiator may be 4-phenoxydichloroacetophenone, 4-t-butyl-dichloroacetophenone, diethoxyacetophenone, 2-hydroxy-2-methyl-1-phenylpropan-1-one, 1-(4-isopropylenephenyl)-2-hydroxy-2-methylpropan-1-one, 1-(4-dodecylphenyl)-2-hydroxy-2-methylpropan-1-one, 4-(2-hydroxyethoxy-phenyl(2-hydroxy-2-propyl) ketone, 1-hydroxycyclohexylphenylketone, 2-methyl-1-[4-(methylthio)phenyl]-2-morpholinopropane-1-one, benzoin, benzoin methyl ether, benzoin ethyl ether, benzoin isopropyl ether, benzoin isobutyl ether, benzyl dimethyl ketal, α-acyloxime ester, acylphosphine oxide, methylphenylglycoxylate, 4-(2-hydroxyethoxy)phenyl-(2-hydroxy-2-propyl)ketone, or 4-benzoyl-4'-methyldiphenylsulfide, but is not limited thereto.

The hydrogen drawing type initiator may be benzophenone, benzoylbenzoate, methyl benzoylbenzoate, 4-phenylbenzophenone, hydroxy benzophenone, 3,3'-dimethyl-4-methoxybenzophenone, 2,4,6-trimethylbenzophenone, 4-methylbenzophenone, thioxanthone, 2-chlorthioxanthone, 2-methylthioxanthone, 2,4-dimethylthioxanthone, isopropylpropyl thioxanthone, campaquinone, dibenzosuberone, 2-ethylanthraquinone, 3,3',4,4'-tetra(t-butylperoxycarbonyl)benzophenone, benzyl, or 9,10-phenanthrenequinone, but is not limited thereto.

In an embodiment, the resin composition includes both a self-cleavage type photopolymerization initiator and a hydrogen drawing type photopolymerization initiator, and an adhesive member formed of the resin composition has an improved balance of photo-crosslinking on a surface portion and photo-crosslinking inside, thereby having a high adhesion.

In an embodiment, the resin composition may include a radical polymerization initiator in an amount of about 0.5 wt % to about 5 wt %. When the radical polymerization initiator exceeds 5 wt %, it tends to easily cause a change in curing by irradiation with active energy rays, and when the radical polymerization initiator is less than 0.5 wt %, the bridging density decreases, lowering adhesion.

In an embodiment, the resin composition may further selectively include conventionally known additives such as fillers, pigments, diluents, anti-aging agents, ultraviolet absorbers, ultraviolet stabilizers, antistatic agents, etc., which are typically mixed, in a range that does not deteriorate desired physical properties thereof. One or two or more additives may be used. The content of such additives may be appropriately set to obtain desired physical properties.

Referring back to FIGS. 4 and 5, an embodiment of the display panel DP may include a base substrate BS, a circuit layer DP-CL disposed on the base substrate BS, and a display element layer DP-EL disposed on the circuit layer DP-CL, and an encapsulation layer TFE covering the display element layer DP-EL. In one embodiment, for example, the display panel DP may include a plurality of organic light emitting elements or a plurality of quantum dot light emitting elements in the display element layer DP-EL.

The configuration of the display panel DP shown in FIG. 5 is merely exemplary and the configuration of the display panel DP is not limited to that shown in FIG. 5. In one alternative embodiment, for example, the display panel DP may include a liquid crystal display element, and the encapsulation layer TFE may be omitted.

The window WP may protect the display panel DP. An image IM generated from the display panel DP may be provided to a user by being transmitted through the window WP. In an embodiment of the display device DD including the folding area FA, the window WP may be a flexible window.

The window WP may include a base layer BL and a printing layer BM. The window WP may include a transmission area TA and a bezel area BZA (FIG. 4). A front surface of the window WP including the transmission area TA and the bezel area BZA corresponds to a front surface of the display device DD. The transmission area TA may be an optically transparent area. The bezel area BZA may be an area having a relatively lower light transmittance than the transmission area TA. The bezel area BZA may have a predetermined color. The bezel area BZA may be adjacent to the transmission area TA and surround the transmission area TA. The bezel area BZA may define the shape of the transmission area TA. However, the embodiment of the invention is not limited thereto, and alternatively, the bezel area BZA may be disposed adjacent to only one side of the transmission area TA, and a part thereof may be omitted.

The base layer BL may be a glass or plastic substrate. In one embodiment, for example, the base layer BL may be a tempered glass substrate. Alternatively, the base layer BL may include or be formed of a flexible polymer resin. In one embodiment, for example, the base layer BL may include or be formed of at least one material selected from polyimide, polyacrylate, polymethylmethacrylate, polycarbonate, polyethylenenaphthalate, polyvinylidene chloride, polyvinylidene difluoride, polystyrene, ethylene vinylalcohol copolymer, and a combination thereof. However, the embodiment of the invention is not limited thereto, and a general form known as the base layer BL of the window WP in the art may be used without limitation.

The printing layer BM may be disposed on one surface of the base layer BL. In an embodiment, the printing layer BM may be provided on a lower surface of the base layer BL adjacent to the display panel DP. The printing layer BM may be disposed on an edge area of the base layer BL. The printing layer BM may be an ink printing layer. In an embodiment, the printing layer BM may be a layer formed by including a pigment or dye. In the window WP, the bezel area BZA (FIG. 4) may be a portion in which the printed layer BM is provided.

In an embodiment, the window WP may further include at least one functional layer (not shown) provided on the base layer BL. In one embodiment, for example, the functional layer (not shown) may be a hard coating layer, an anti-fingerprint coating layer, etc., but the embodiment of the invention is not limited thereto.

In an embodiment, a step structure may be formed or defined between the portion provided with the printing layer BM and the base layer BL without the printing layer BM. In an embodiment, an adhesive member AP including or formed from the resin composition has high applicability as described above and may thus be attached to the window WP without lifting at the step portion.

In an embodiment, the adhesive member AP may include or be formed of the resin composition described above. In such an embodiment, the adhesive member AP includes or is formed from the resin composition including a first (meth)acrylic resin having a weight average molecular weight of 500 or less, a second (meth)acrylic resin having a weight average molecular weight of 6,000 or more, a radical polymerization initiator, and a polyrotaxane compound, and having a viscosity of about 1.0 mPa·s to about 100 mPa·s at 25° C. In such an embodiment, the first (meth)acrylic resin, the second (meth)acrylic resin, the radical polymerization initiator, and the polyrotaxane compound are substantially the same as those described above, and any repetitive detailed description thereof will be omitted or simplified.

The adhesive member AP may satisfy Formula 2 below.

$$0.9 < A'/B' < 4 \quad \text{[Formula 2]}$$

In Formula 2 above, A' denotes a storage modulus of the adhesive member at 25° C., and B' denotes a storage modulus of the adhesive member at 60° C.

In an embodiment, the adhesive member AP included in the display device DD is provided on one surface of the window WP or one surface of the display panel DP in a liquid resin composition state, and may be formed by ultraviolet-curing the liquid resin composition provided between the window WP and the display panel DP. In an alternative embodiment, the adhesive member AP may be provided by ultraviolet-curing the liquid resin composition in a separate process, laminating one surface of the adhesive member AP in a cured state in the form of an adhesive film on one surface of the window WP or one surface of the display panel DP, and attaching one surface of the window WP or one surface of the display panel DP, which is unattached, to the other surface of the adhesive member AP.

The thickness of the adhesive member AP may be in a range of about 20 micrometers (μm) to about 200 μm. In one embodiment, for example, the adhesive member AP may have a thickness of about 30 μm or more, or about 40 μm or more, and may have a thickness of about 150 μm or less, or about 100 μm or less.

An embodiment of the display device DD includes the adhesive member AP including or formed from the resin composition described above, and the adhesive member AP exhibits high durability, thereby effectively preventing lifting at an interface of the adhesive member AP even when the display device DD is folded or bent, and also maintaining effective adhesion even in a high temperature environment to exhibit high reliability characteristics.

Figure 6A:
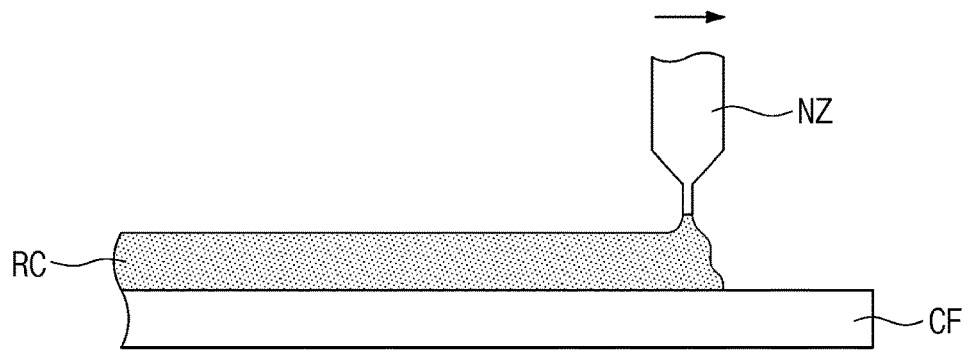
FIGS. 6A to 6C are views illustrating a method for preparing an adhesive member according to an embodiment.
Figure 6B:
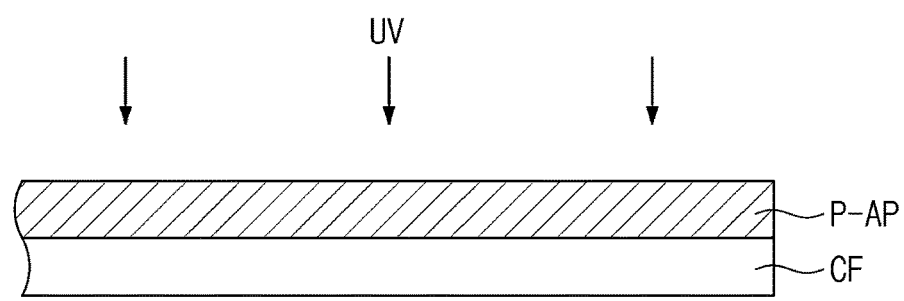
Figure 6C:
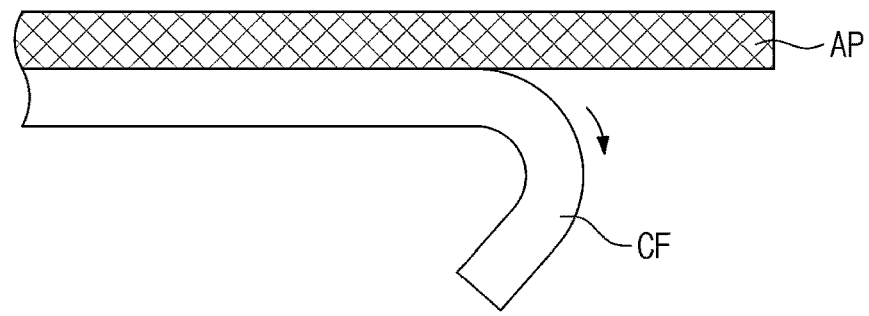

FIGS. 6A to 6C are views schematically illustrating a method of preparing an adhesive member AP according to an embodiment. FIG. 6A illustrates a process of providing a resin composition RC for forming an adhesive member AP, FIG. 6B illustrates a process of UV irradiation, and FIG. 6C illustrates a process of removing a carrier film CF.

Referring to FIGS. 6A to 6C, in an embodiment of a method of preparing an adhesive member AP, the resin composition RC may be provided on the carrier film CF. In one embodiment, for example, a polyethylene terephthalate ("PET") film may be used as the carrier film CF, but the embodiment of the invention is not limited thereto. The carrier film CF serves as a substrate for coating the liquid resin composition RC, and may be used without limitation as long as it is easily detached from the adhesive member AP after ultraviolet-curing. In one embodiment, for example, release treatment may be performed on one surface of the carrier film CF to be provided with the resin composition RC.

The resin composition RC may be provided by a predetermined method such as an inkjet printing method or a dispensing method. In one embodiment, for example, the resin composition RC may be an inkjet printing composition having properties suitable for use with an inkjet printing method. In an embodiment, the resin composition RC may be easily discharged from a nozzle NZ, etc. by having a viscosity value in a range of about 1.0 mPa·s to about 100 mPa·s at 25° C., and may be provided to maintain a constant coating thickness.

A pre-adhesive member P-AP provided by coating the resin composition RC with a constant thickness may be irradiated with ultraviolet ("UV") light. FIG. 6B illustrates an embodiment where the coated pre-adhesive member P-AP is directly irradiated with the UV light, but the embodiment is not limited thereto. In an alternative embodiment, an auxiliary carrier film (not shown) may be further disposed on the pre-adhesive member P-AP, and the auxiliary carrier film (not shown) transmits ultraviolet light and may cover the pre-adhesive member P-AP during the ultraviolet-curing process.

After ultraviolet-curing, an adhesive member AP may be formed. The adhesive member AP finally provided by removing the carrier film CF used in the process may satisfy Formula 2 described above.

The adhesive member AP prepared in the processes of FIGS. 6A to 6C may be applied to the display device DD described above. In one embodiment, for example, one surface of the adhesive member AP is attached on the display panel DP, and then the windows WP may be sequentially attached on the opposing surface of the adhesive member AP facing the one surface of the adhesive member AP attached to the display panel DP. In an embodiment, unlike the one above, the adhesive member AP may be provided to the display device DD by attaching one surface of the adhesive member AP on one surface of the window WP to face the display panel DP, and then attaching the other surface of the adhesive member AP facing one surface of the adhesive member AP attached to the window WP to the display panel DP.

Figure 7A:
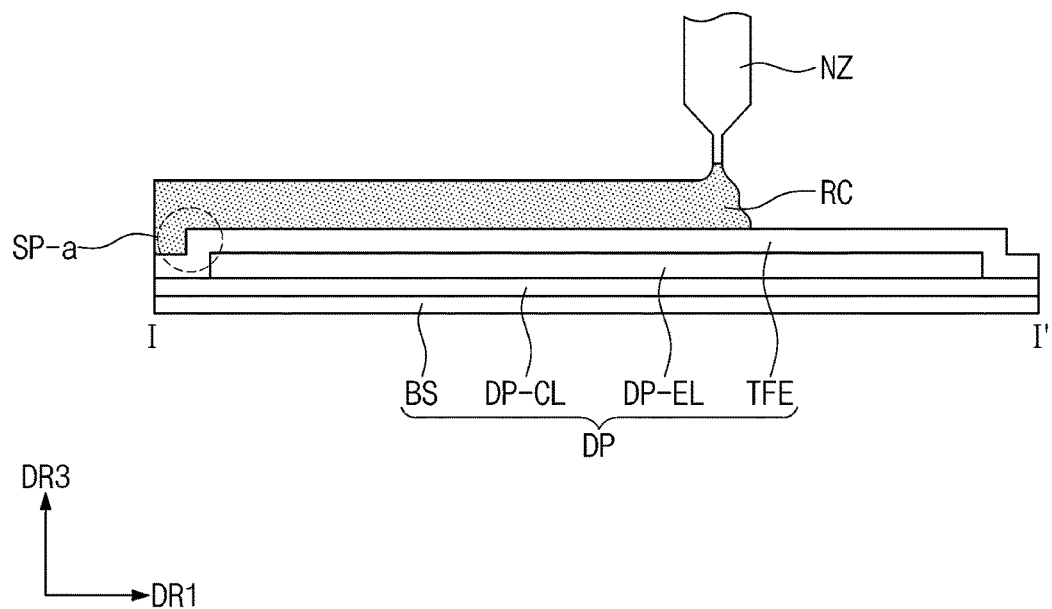
FIGS. 7A and 7B are views illustrating a method for preparing an adhesive member according to an alternative embodiment.
Figure 7B:
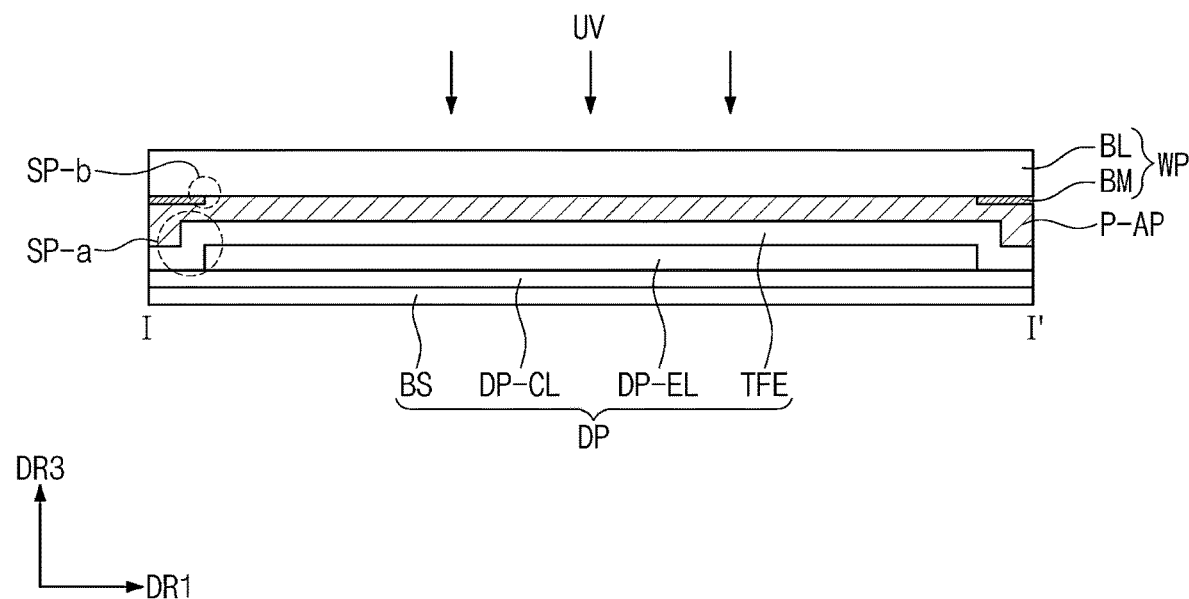

In an alternative embodiment, the resin composition provided in a liquid state between the display panel DP and the window WP may be cured to form an adhesive member AP. FIGS. 7A and 7B illustrate a method of preparing an adhesive member AP included in the display device DD according to an alternative embodiment of a method, which is different from the method for preparing the adhesive member AP described with reference to FIGS. 6A to 6C.

FIG. 7A illustrates a process of providing a resin composition RC on the display panel DP, and FIG. 7b illustrates a process of irradiating a pre-adhesive member P-AP formed from the resin composition RC with ultraviolet light.

The resin composition RC may be provided by a predetermined method such as an inkjet printing method or a dispensing method. The resin composition RC may be easily discharged from a nozzle NZ, etc. by having a viscosity value in a range of about 1.0 mPa·s to about 100 mPa·s at 25° C., and may be provided to maintain a thin, constant coating thickness. In such an embodiment, the resin composition may be provided while covering the uneven structure of a step portion SP-a of the display panel DP by having a viscosity value of about 1.0 mPa·s to about 100 mPa·s. In such an embodiment, by having a low viscosity value of 100 mPa·s or less, the resin composition RC may be effectively filled without an empty space in an uneven portion such as the step portion SP-a. In such an embodiment, the resin composition RC provided through the nozzle NZ may have a viscosity value of 1.0 mPa·s or more to be substantially uniformly coated to have a predetermined thickness without flowing out of the display panel DP.

A window WP may be provided on the pre-adhesive member P-AP provided by coating the resin composition RC to a constant thickness. UV light for curing the resin composition RC may be provided through the window WP. When the window WP is provided on the pre-adhesive member P-AP, the resin composition RC may be filled without an empty space in a step portion SP-b. In such an embodiment, the resin composition RC has a low viscosity value of 100 mPa·s or less, thereby covering the curve shape at the uneven portion such as the step portion SP-a between the base layer BL and the printing layer BM to provide the pre-adhesive member P-AP. The pre-adhesive member P-AP may be cured after polymerization by the provided UV light to form an adhesive member AP.

In an alternative embodiment, unlike shown in FIG. 7B, before the window WP is provided on the pre-adhesive member P-AP, UV light is provided to the pre-adhesive member P-AP to perform polymerization reaction in the resin composition RC. The amount of UV light irradiation may be an amount of light that serves to fully cure the resin composition RC. Alternatively, the final adhesive member AP may be formed by partially performing the polymerization reaction of the resin composition RC in the pre-adhesive member P-AP state, and then further reacting an unreacted resin composition RC after covering the window WP.

In embodiments according to the invention, as described above with reference to FIGS. 1 to 3, the display device DD or DD-b includes an adhesive member AP including a polymer derived from the resin composition described above to maintain the adhesive state of the window WP and the display panel DP, without lifting of the adhesive member AP even in the folded state or the bending area.

Figure 8:
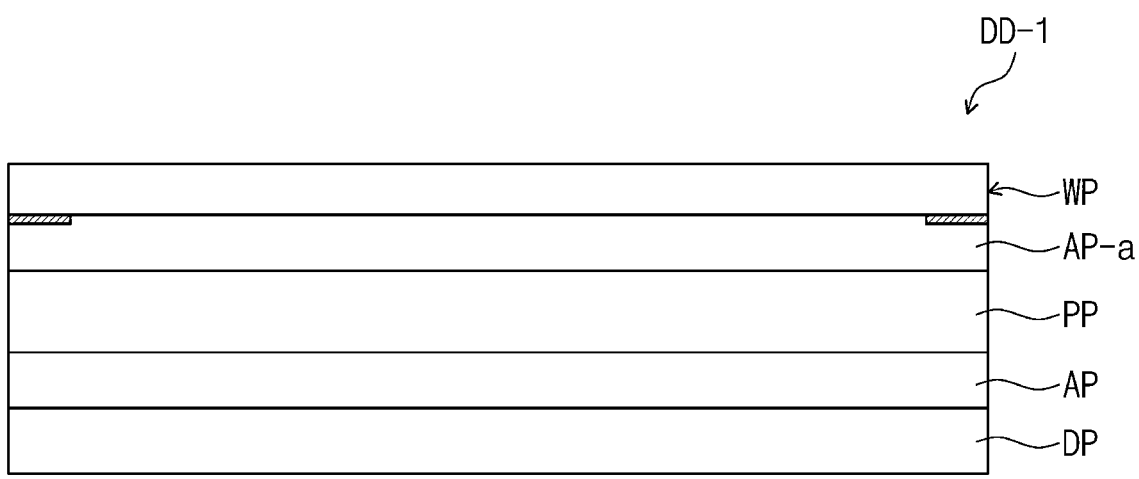
FIG. 8 is a cross-sectional view of a display device according to an alternative embodiment.

FIG. 8 is a cross-sectional view illustrating a display device according to an alternative embodiment.

An embodiment of the display device DD-1 shown in FIG. 8 is substantially the same as the embodiments of the display device DD or DD-b described above with reference to FIGS. 1 to 7B except that the display device DD-1 shown in FIG. 8 may further include a light control layer PP and an optical adhesive layer AP-a. Accordingly, any repetitive detailed description of the same or like elements shown in FIG. 8 will be omitted or simplified In an embodiment, as shown in FIG. 8, the display device DD-1 may further include a light control layer PP and an optical adhesive layer AP-a. In such an embodiment, the display device DD-1 may further include a light control layer PP disposed between the adhesive member AP and the window WP, and an optical adhesive layer disposed between the light control layer PP and the window WP. The light control layer PP is disposed on the display panel DP to control reflected light from the display panel DP due to external light. The light control layer PP may include, for example, a polarizing layer or a color filter layer.

The optical adhesive layer AP-a may be an OCA or an OCR. The optical adhesive layer AP-a may include or be formed from the resin composition in a same manner as the adhesive member AP (FIG. 5) described above. In such an embodiment, the optical adhesive layer AP-a may include or be formed from a resin composition including a first (meth)acrylic resin having a weight average molecular weight of 500 or less, a second (meth)acrylic resin having a weight average molecular weight of 6,000 or more, a radical polymerization initiator, and a polyrotaxane compound and having a viscosity in a range of about 1.0 mPa·s to about 100 mPa·s at 25° C.

Such an embodiment of the display device DD-1 includes an optical adhesive layer AP-a and an adhesive member AP including or formed from the resin composition, and the optical adhesive layer AP-a and the adhesive member AP exhibit high durability, thereby effectively preventing lifting at an interface of the optical adhesive layer AP-a and the adhesive member AP even when the display device DD-1 is folded or bent to exhibit excellent reliability characteristics.

Hereinafter, with reference to Examples and Comparative Examples, embodiments of a resin composition, an adhesive member, and a display device of the invention will be described in greater detail. Examples shown below are illustrated only for the understanding of the invention, and the scope of the invention is not limited thereto.

EXAMPLE

1. Preparation of Resin Composition

The resin compositions of Examples and Comparative Examples were prepared by the mixing ratios shown in Table 1. It was provided in a heat-resistant, light-shielding container at the weight (g) disclosed in Table 1. As an initiator, ominirad TPO-H, esacure 3644, photomer4250, and ominirad819 were mixed in a weight ratio of 60:10:1:30 with respect to the total amount of an acrylic resin, and weighed by 2% by weight to be added to the heat-resistant, light-shielding container. The resin compositions of Examples and Comparative Examples were prepared by stirring at a room temperature and an atmospheric pressure at a rate of 100 revolutions per minute (rmp) for about 1 hour. The viscosity of the prepared resin compositions was measured at 25° C. using the JIS K2283 method, and was measured at a rate of 10 rpm using VISCOMETER (TVE-25 manufactured by TOKI SANGYO CO., LTD).

TABLE 1

| Component | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| A | 4-HBA | 0 | 10 | 10 | 10 | 5 | 0 | 0 | 10 | 5 | 0 |
|  | IDAA | 45 | 35 | 35 | 35 | 40 | 45 | 45 | 35 | 40 | 45 |
| B | UF-C051 | 5 | 5 | 5 | 5 | 5 | 5 | 5 | 5 | 5 | 5 |
|  | Polyrotaxane | 2.5 | 0.5 | 1.5 | 2.5 | 2.5 | 2.5 | 0 | 0 | 0 | 2.5 |
|  | Solvent (methyl ethyl ketone) | 0 | 0 | 0 | 0 | 0 | 0.5 | 0 | 0 | 0 | 5 |
|  | Viscosity (mPa) | 16 | 21 | 25 | 26 | 16 | 15 | 14 | 20 | 17 | 12 |

<Material Used as Component a (First (Meth)Acrylic Resin)>

4HBA: 4-hydroxybutyl acrylate, molecular weight 144.2

IDAA: iso-decylacrylate, molecular weight 212

<Material Used as Component B (Second (Meth)Acrylic Resin)>

UF-C051, average molecular weight 35,000

Polyrotaxane: represented by Formula 1 below.

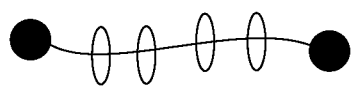
[Formula 1]

In formula 1,

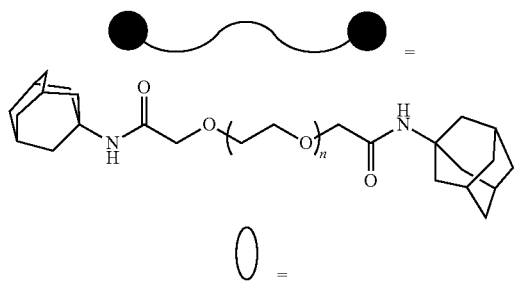

α-cyclodextrin or a-cyclodextrin to which a radical polymerizable group is added. For the method of synthesizing polyrotaxane, refer to Macromolecules 2017, 50, 5695-5700.

1. Evaluation of Physical Properties of Resin Composition and Adhesive Member Formed from the Resin Composition

[Method of Measuring Storage Modulus]

The resin compositions of Examples and Comparative Examples were applied to a glass substrate at 0.15 millimeters (mm), and photocured by UV radiation with a light amount of 4000 millijoule per square centimeter ($mJ/cm^2$) to measure storage modulus. The storage modulus was measured by dynamic viscoelasticity measurement using MCR302 manufactured by Anton-Paar at a frequency of 1 Hz at −20° C. to 60° C.(heating rate 5° C./min). The value of Formula 2 was calculated from the values measured at 25° C. and 60° C.

[Durability Measurement]

The resin compositions according to the Examples and Comparative Examples were applied between a polyethylene telephthalate film (Cosmoshine 4100, thickness 100 μm, manufactured by Toyo Boseki Co., Ltd.) and a slide glass (S1112 manufactured by Matsunami Glass Ind., Ltd.) to a thickness of 100 μm and attached. After attaching, at the slide glass side, UV irradiation was performed using a metal halide lamp (conveyor type ultraviolet irradiation apparatus manufactured by Eye Graphics Co., Ltd.) at an integrated light intensity of 4000 $mJ/cm^2$ to obtain a laminate. The laminate obtained above was kept at a high temperature or high temperature and high humidity (e.g., 85° C., 85% RH) environment for 72 hours to observe occurrence of lifting, delamination, etc. at the interface with an adherend. The laminate was evaluated as "◉" when there was no change in appearance in the laminate, "○" when there is no lifting or delamination, but deformation of the adhesive member is observed, and "X" when there is lifting or delamination.

[Cured Product Properties]

After forming a laminate in the same manner as the durability measurement method, transparency of the appearance was observed. It was evaluated as "OK" when transparency was recognized and "NG" when defects were observed in white turbidity or curing.

TABLE 2

| Evaluation item | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Formula 2 | 1.1 | 2.4 | 1.3 | 1.1 | 0.9 | 0.021 | 8 | 4.8 | 12.6 | — |
| Storage modulus (60° C.)/ (×103 Pa) | 25 | 13 | 43 | 65 | 66 | 21 | 0.5 | 4.6 | 0.73 | — |
| Cured product properties | OK | OK | OK | OK | OK | OK | OK | OK | OK | NG |
| durability | ◉ | ○ | ◉ | ◉ | ◉ | ◉ | X | X | X | X |

Referring to the results in Table 2, it may be confirmed that all of the adhesive members formed of the resin compositions of Examples 1 to 6 satisfy Formula 2, and deterioration in elastic modulus at a high temperature is effectively prevented. As shown in Table 2, it may be confirmed that Example 6, which contains less than 1% of an organic solvent, has a similar effect compared to Example 1, which does not contain an organic solvent. As shown in Table 2, the adhesive members formed of the resin composition of Comparative Examples 1 to 3 do not satisfy Formula 2, and it may be confirmed that the elastic modulus at a high temperature is particularly deteriorated.

The adhesive member formed of the resin composition of Comparative Example 4 had white turbidity, thereby confirming curing failure.

The resin composition has desired properties in forming a uniform coating film of a thin thickness having a viscosity of about 1.0 mPa·s to about 100 mPa·s before curing, and may utilize an inkjet printing method due to low viscosity characteristics, and exhibit high coating properties even on a curved surface. In an embodiment, the adhesive member including or formed from the resin composition may maintain high durability even at a high temperature. In an embodiment, the display device includes an adhesive member having high durability to exhibit high reliability without delamination or lifting of the adhesive member in a curved portion, and has no delamination between the adhesive member and adjacent members even in the operation state of bending or folding to exhibit high operational reliability.

According to an embodiment of the invention, a resin composition has low viscosity properties and may thus exhibit high applicability for substrates of various shapes, and prevent deterioration in storage modulus at a high temperature.

According to an embodiment of the invention, an adhesive member includes or is formed from a resin composition having a predetermined viscosity, which is controlled, and may thus maintain high durability without being substantially affected by external conditions.

According to an embodiment of the invention, a display device includes an adhesive member having high adhesion, and may thus exhibit high reliability in various operation states and high temperature environments.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A resin composition comprising:
 a first (meth)acrylic resin having a weight average molecular weight of about 500 or less; where the first (meth)acrylic resin consists of at least one selected from 2-ethylhexylacrylate, 4-hydroxybutyl acrylate, n-butyl(meth)acrylate, i-butyl(meth)acrylate, t-butyl (meth)acrylate, isooctyl(meth)acrylate, isodecyl(meth) acrylate, lauryl(meth)acrylate, stearyl(meth)acrylate, and isostearyl(meth)acrylate;
 a second (meth)acrylic resin having a weight average molecular weight of about 6,000 or more;
 a radical polymerization initiator; and
 a polyrotaxane compound,
 wherein the resin composition has a viscosity in a range of about 1.0 mPa·s to about 100 mPa·s at 25° C.;
 wherein a content of the second (meth)acrylic resin is in a range of about 5 wt % to about 15 wt % with respect to the total content of 100 wt % of the first (meth)acrylic resin and the second (meth)acrylic resin.

2. The resin composition of claim 1, wherein the resin composition satisfies the following formula: 0.9<A/B<4,
 wherein
 A denotes a storage modulus at 25° C. after ultraviolet-curing of the resin composition, and
 B denotes a storage modulus at 60° C. after ultraviolet-curing of the resin composition.

3. The resin composition of claim 1, wherein the resin composition further comprises an organic solvent in an amount of about 0 wt % to about 1 wt %.

4. The resin composition of claim 1, wherein the polyrotaxane compound has a radical curable group on a side chain thereof.

5. The resin composition of claim 4, wherein the radical curable group is an acrylate group or a methacrylate group.

6. The resin composition of claim 1, wherein the radical polymerization initiator comprises a self-cleavage type radical polymerization initiator and a hydrogen drawing type radical polymerization initiator.

7. The resin composition of claim 1, wherein a content of the radical polymerization initiator is in a range of about 0.5 wt % to about 5 wt %.

8. The resin composition of claim 1, wherein a content of the polyrotaxane compound is in a range of about 1 wt % to about 10 wt %.

9. An adhesive member comprising the resin composition of claim 1.

10. The adhesive member of claim 9, wherein the adhesive member satisfies the following formula: 0.9<A'/B'<4,
 wherein
 A' denotes a storage modulus of the adhesive member at 25° C., and
 B' denotes a storage modulus of the adhesive member at 60° C.

11. The adhesive member of claim 9, wherein the resin composition is an inkjet printing composition.

12. A display device comprising:
 a display panel;
 a window disposed on the display panel; and
 an adhesive member disposed between the display panel and the window,
 wherein the adhesive member comprises the resin composition of claim 1.

13. The display device of claim 12, wherein a thickness of the adhesive member is in a range of about 20 μm to about 200 μm.

14. The display device of claim 12, wherein the adhesive member is defined by a layer formed by directly providing the resin composition on one surface of the display panel and ultraviolet-curing the provided resin composition.

15. The display device of claim 12, wherein
 a folding area is defined in the display device, and
 the folding area has a radius of curvature of about 5 mm or less.

16. The display device of claim 12, wherein the adhesive member satisfies the following formula: $0.9<A'/B'<4$,
wherein
A' denotes a storage modulus of the adhesive member at 25° C., and
B' denotes a storage modulus of the adhesive member at 60° C.

17. The display device of claim 12, wherein the resin composition further comprises an organic solvent in an amount of about 0 wt % to about 1 wt %.

18. The display device of claim 12, further comprising:
a light control layer disposed between the adhesive member and the window; and
an optical adhesive layer disposed between the light control layer and the window,
wherein the optical adhesive layer comprises a polymer derived from the resin composition.

19. The display device of claim 18, wherein the light control layer is a polarizing plate or a color filter layer.

* * * * *